(12) United States Patent
Kaji et al.

(10) Patent No.: US 10,151,898 B2
(45) Date of Patent: Dec. 11, 2018

(54) FORMER, OPTICAL FIBER UNIT MANUFACTURING METHOD AND OPTICAL CABLE MANUFACTURING METHOD

(71) Applicant: FUJIKURA LTD., Koto-ku, Tokyo (JP)

(72) Inventors: Tomoaki Kaji, Sakura (JP); Daiki Takeda, Sakura (JP); Satoru Shiobara, Sakura (JP); Masayoshi Yamanaka, Sakura (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 341 days.

(21) Appl. No.: 15/037,840

(22) PCT Filed: Mar. 24, 2014

(86) PCT No.: PCT/JP2014/058017
§ 371 (c)(1),
(2) Date: May 19, 2016

(87) PCT Pub. No.: WO2015/104853
PCT Pub. Date: Jul. 16, 2015

(65) Prior Publication Data
US 2016/0299311 A1 Oct. 13, 2016

(30) Foreign Application Priority Data
Jan. 10, 2014 (JP) ................ 2014-003670

(51) Int. Cl.
*G02B 6/44* (2006.01)
*B29C 63/02* (2006.01)
(Continued)

(52) U.S. Cl.
CPC .......... *G02B 6/4486* (2013.01); *B29C 63/024* (2013.01); *B29C 63/105* (2013.01);
(Continued)

(58) Field of Classification Search
CPC ...... G02B 6/443; G02B 6/4486; H01B 13/26; B29C 53/58; B29C 53/581; B29C 53/72;
(Continued)

(56) References Cited

U.S. PATENT DOCUMENTS 2,372,645 A 4/1945 Barmack
6,236,790 B1 5/2001 Okada et al.
6,480,653 B1 * 11/2002 Hulin ................. G02B 6/4413
385/100

FOREIGN PATENT DOCUMENTS

CN 1234512 A 11/1999
EP 0 945 746 A2 9/1999
(Continued)

OTHER PUBLICATIONS

International Search Report for PCT/JP2014/058017 dated Jun. 24, 2014.
(Continued)

*Primary Examiner* — Carson Gross
(74) *Attorney, Agent, or Firm* — Sughrue Mion, PLLC

(57) ABSTRACT

A former including: a guide pipe guiding an optical fiber bundle; a tape forming section forming a press-wrapping tape from a strip shape into a helical shape, while guiding the press-wrapping tape along a feed direction, the tape forming section including a curved section gradually curving the strip shaped press-wrapping tape while guiding the press-wrapping tape along the feed direction, and a helical section that is a helical tube shaped location further to a downstream side than a position where two edges of the curved section intersect with each other, the helical section causing two end portions of the press-wrapping tape that has been curved with the curved section to overlap and forming the press-wrapping tape into a helical shape, while guiding the press-wrapping tape along the feed direction, and gradually nar- (Continued)

rowing an external diameter of the helical shaped press-wrapping tape.

7 Claims, 11 Drawing Sheets

(51) Int. Cl.
  *B29C 63/10*   (2006.01)
  *B29D 11/00*   (2006.01)
  *B29C 53/72*   (2006.01)
  *B29C 53/58*   (2006.01)
  *B29C 63/08*   (2006.01)
  *H01B 13/26*   (2006.01)
  *B29L 11/00*   (2006.01)

(52) U.S. Cl.
  CPC ........ *B29D 11/00721* (2013.01); *B29C 53/58* (2013.01); *B29C 53/581* (2013.01); *B29C 53/72* (2013.01); *B29C 63/08* (2013.01); *B29C 63/10* (2013.01); *B29K 2995/0018* (2013.01); *B29L 2011/0075* (2013.01); *G02B 6/443* (2013.01); *G02B 6/448* (2013.01); *G02B 6/4495* (2013.01); *H01B 13/26* (2013.01)

(58) Field of Classification Search
  CPC ....... B29C 63/08; B29C 63/10; B29C 63/105; B65H 81/06; B65H 81/08
  USPC ............... 156/195, 53, 54, 200, 201, 465
  See application file for complete search history.

(56) References Cited

FOREIGN PATENT DOCUMENTS

| JP | 11-271581 A | 10/1999 |
|----|-------------|---------|
| JP | 2004-12916 A | 1/2004 |
| JP | 2013-101175 A | 5/2013 |

OTHER PUBLICATIONS

Communication dated Apr. 28, 2018, issued by the State Intellectual Property Office of the P.R.C. in counterpart application No. 201480065768.5.

Extended European Search Report for PCT/JP2014/058017 dated Aug. 2, 2017.

International Preliminary Report on Patentability dated Jul. 21, 2016 from the International Bureau in counterpart International Application No. PCT/JP2014/058017.

* cited by examiner

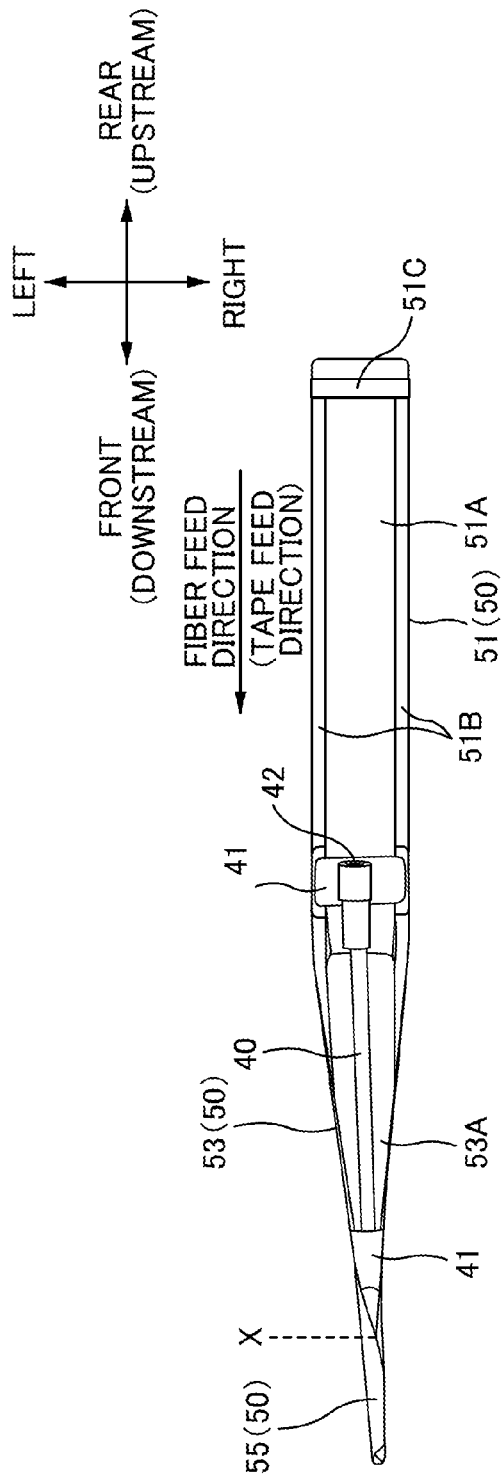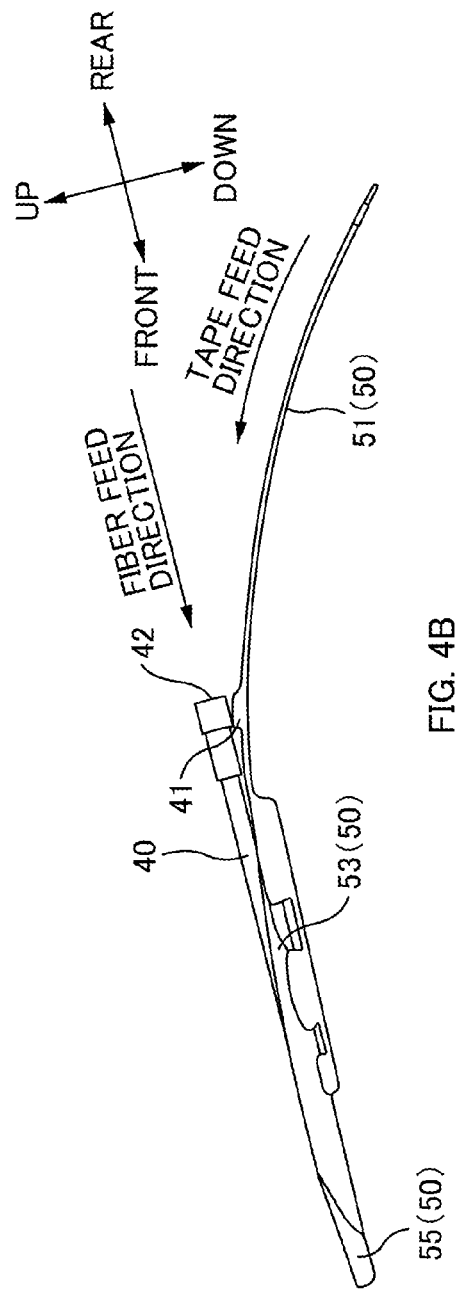
FIG. 4A
FIG. 4B

FORMER, OPTICAL FIBER UNIT MANUFACTURING METHOD AND OPTICAL CABLE MANUFACTURING METHOD

CROSS REFERENCE TO RELATED APPLICATIONS

This application is a National Stage of International Application No. PCT/JP2014/058014 filed Mar. 24, 2014, claiming priority based on Japanese Patent Application No. 2014-003670 filed Jan. 10, 2014, the contents of all of which are incorporated herein by reference in their entirety.

TECHNICAL FIELD

The present invention relates to a former, an optical fiber unit manufacturing method, and an optical cable manufacturing method.

BACKGROUND ART

Optical cables are known in which a plurality of optical fibers are disposed inside a press-wrapping tape processed into a helical shape (a circular cylinder shape). In Patent Literature 1, press-wrapping tape is formed into a helical shape by passing the press-wrapping tape through a former having a helical shaped groove including an overlap section.

Note that Patent Literature 2 and 3 also disclose formers (also referred to as tape formers) for forming press-wrapping tape.

CITATION LIST

Patent Literature

Patent Literature 1: JP 2013-101175 A
Patent Literature 2: JP H11-271581 A
Patent Literature 3: JP 2004-12916 A

SUMMARY OF INVENTION

Technical Problem

In Patent Literature 1, after a press-wrapping tape has been formed into a helical shape and imparted with a curl, the press-wrapping tape formed in a helical shape needs to be temporarily opened in order to house an optical fiber bundle to the inside of the press-wrapping tape (see paragraph [0034] of Patent Literature 1). However, if the press-wrapping tape that has been curled into a helical shape is opened, then the formed diameter of the press-wrapping tape widens. This results in it being difficult to decrease the diameter of optical cable cores and optical cables, and might give rise to gaps developing between the press-wrapping tape and the optical fiber bundle, and creases (wrinkles) being formed in the press-wrapping tape, impairing the transmission properties of the optical fibers.

Moreover, in Patent Literature 2, in a state in which optical fiber tape core strands are resting on a strip shaped press-wrapping, the press-wrapping is gradually shrunk in diameter using a tape former, and the optical fiber tape core strands are enveloped in the press-wrapping. However, in such a method, due to the optical fiber bundle not being guided, there is the possibility that, when the press-wrapping tape is being formed into a helical shape and the optical fiber bundle is being wrapped, any optical fibers protruding outside the press-wrapping tape might become pinched and severed in an overlap section of the press-wrapping tape, or that optical fibers might stray outside the press-wrapping tape. This results in the possibility that the transmission properties of the optical fibers might be impaired.

An objective of the present invention is to wrap an optical fiber bundle in a press-wrapping tape while guiding the optical fiber bundle.

Solution to Problem

A primary aspect of the invention for achieving the aforementioned objective is a former including: (A) a guide pipe that guides an optical fiber bundle configured from a plurality of optical fibers; (B) a tape forming section that forms a press-wrapping tape from a strip shape into a helical shape, while guiding the press-wrapping tape along a feed direction, the tape forming section including a curved section that gradually curves the strip shaped press-wrapping tape while guiding the press-wrapping tape along the feed direction, and a helical section that is a helical tube shaped location further to a downstream side than a position where two edges of the curved section intersect with each other, the helical section causing two end portions of the press-wrapping tape that has been curved with the curved section to overlap and forming the press-wrapping tape into a helical shape, while guiding the press-wrapping tape along the feed direction, and gradually narrowing an external diameter of the helical shaped press-wrapping tape, wherein (C) an outlet of the guide pipe is disposed further to the downstream side than the position where the two edges of the curved section intersect with each other.

Other features of the present invention are made clear by the Description and Drawings below.

Advantageous Effects of Invention

The present invention enables an optical fiber bundle to be wrapped in a press-wrapping tape while guiding the optical fiber bundle.

BRIEF DESCRIPTION OF DRAWINGS

FIG. 4A is diagram illustrating a former 30 of a first embodiment, as viewed from above.
FIG. 4B is a side view of the former 30.
FIG. 7A is a cross-section illustrating a state in which the optical fiber bundle 2 and the press-wrapping are not present,
and FIG. 7B is a cross-section illustrating a state in which the optical fiber bundle 2 and the press-wrapping are present (during manufacture of the optical cable 1).

DESCRIPTION OF EMBODIMENTS

Figure 1:
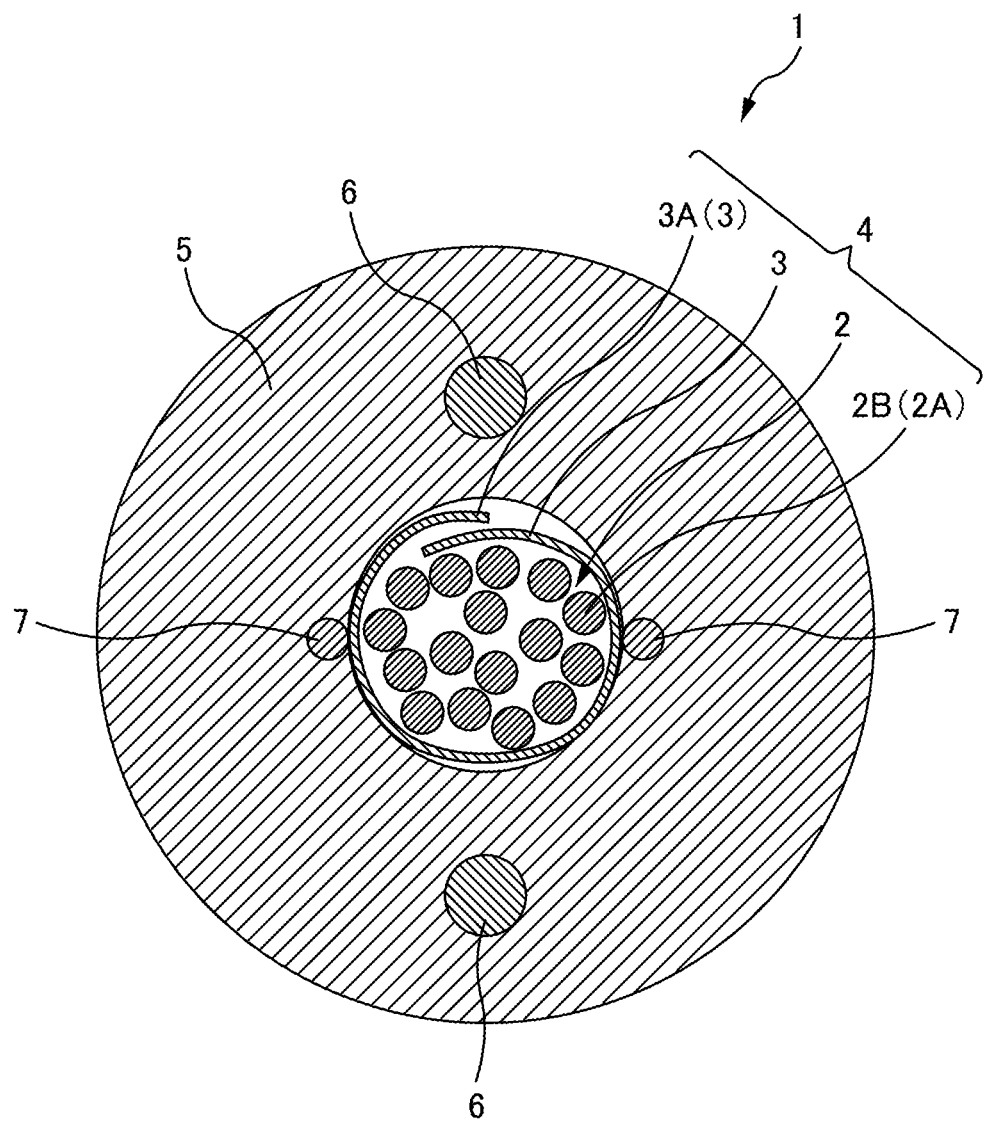
FIG. 1 is cross-section of an optical cable 1.

At least the following matters are made clear from the Description and Drawings described below.

Clear disclosure is given of a former including: (A) a guide pipe that guides an optical fiber bundle configured from a plurality of optical fibers; (B) a tape forming section that forms a press-wrapping tape from a strip shape into a helical shape, while guiding the press-wrapping tape along a feed direction, the tape forming section including a curved section that gradually curves the strip shaped press-wrapping tape while guiding the press-wrapping tape along the feed direction, and a helical section that is a helical tube shaped location further to a downstream side than a position where two edges of the curved section intersect with each other, the helical section causing two end portions of the press-wrapping tape that has been curved with the curved section to overlap and forming the press-wrapping tape into a helical shape, while guiding the press-wrapping tape along the feed direction, and gradually narrowing an external diameter of the helical shaped press-wrapping tape, wherein (C) an outlet of the guide pipe is disposed further to the downstream side than the position where the two edges of the curved section intersect with each other.

Such a former is able to wrap an optical fiber bundle in a press-wrapping tape while guiding the optical fiber bundle.

The outlet of the guide pipe is preferably disposed further to an upstream side than an end portion of the helical section to a downstream side. Moreover, an internal diameter of the end portion of the helical section to the downstream side is preferably smaller than an external diameter of the guide pipe. This thereby enables a gap between the press-wrapping tape and the optical fiber bundle to be narrowed.

Preferably a leading end of the guide pipe to a downstream side is obliquely cut to form an elliptical shaped opening, and a leading end portion is formed to a downstream side of an outlet positioned to an upstream end of the opening. This thereby enables a gap between the press-wrapping tape and the optical fiber bundle to be narrowed.

Preferably an outer face of the leading end portion is disposed facing an edge to an inside of the helical section. This thereby enables the optical fiber to be suppressed from intruding into the overlap section.

Preferably the leading end portion is disposed to an inside of the helical section having an internal diameter smaller than an external diameter of the guide pipe. This thereby enables a gap between the press-wrapping tape and the optical fiber bundle to be narrowed.

Preferably a turn-back fold is formed to an edge of the curved section to restrain an end portion in a width direction of the press-wrapping tape, and the turn-back fold is not formed in the helical section. This thereby enables a gap between the press-wrapping tape and the overlap section to be narrowed.

Clear disclosure is given of a manufacturing method of an optical fiber unit in which an optical fiber bundle configured from a plurality of optical fibers is wrapped in a press-wrapping tape, the optical fiber unit manufacturing method including: preparing a former including a guide pipe that guides the optical fiber bundle, and a tape forming section that forms a press-wrapping tape from a strip shape into a helical shape while guiding the press-wrapping tape along a feed direction; feeding the optical fiber bundle while guiding the optical fiber bundle with the guide pipe; gradually causing the strip shaped press-wrapping tape to curve while guiding the press-wrapping tape with a curved section of the former; while guiding the press-wrapping tape using a helical section that is a helical tube shaped location further to a downstream side than a position where two edges of the curved section intersect with each other, causing two end portions of the press-wrapping tape that has been curved with the curved section to overlap and forming the press-wrapping tape into a helical shape, and gradually narrowing an external diameter of the helical shaped press-wrapping tape; and feeding the optical fiber bundle out from an outlet of the guide pipe, disposed further to the downstream side than the position where the two edges of the curved section intersect with each other, and into the helical shaped press-wrapping tape.

Such an optical fiber unit manufacturing method enables an optical fiber bundle to be wrapped in a press-wrapping tape while guiding the optical fiber bundle.

Preferably the press-wrapping tape is discharged from the helical section in a tension-applied state. A state in which the optical fiber bundle is wrapped in the press-wrapping tape is thereby maintained, even after being discharged from the helical section, and therefore the optical fiber bundle can be prevented from straying outside the press-wrapping tape.

Clear disclosure is given of a manufacturing method of an optical cable including an optical fiber bundle configured from a plurality of optical fibers and a press-wrapping tape wrapping the optical fiber bundle, the optical cable manufacturing method including: preparing a former including a guide pipe that guides the optical fiber bundle, and a tape forming section that forms a press-wrapping tape from a strip shape into a helical shape while guiding the press-wrapping tape along a feed direction; feeding the optical fiber bundle while guiding the optical fiber bundle with the guide pipe; gradually causing the strip shaped press-wrapping tape to curve while guiding the press-wrapping tape with a curved section of the former; while guiding the press-wrapping tape using a helical section that is a helical tube shaped location further to a downstream side than a position where two edges of the curved section intersect with each other, causing two end portions of the press-wrapping tape that has been curved with the curved section to overlap and forming the press-wrapping tape into a helical shape, and gradually narrowing an external diameter of the helical shaped press-wrapping tape; and feeding the optical fiber bundle out from an outlet of the guide pipe, disposed further to the downstream side than the position where the two edges of the curved section intersect with each other, and into the helical shaped press-wrapping tape.

Such an optical cable manufacturing method enables an optical fiber bundle to be wrapped in a press-wrapping tape while guiding the optical fiber bundle.

Preferably the press-wrapping tape is discharged from the helical section in a tension-applied state. A state in which the optical fiber bundle is wrapped in the press-wrapping tape is thereby maintained, even after being discharged from the helical section, and therefore the optical fiber bundle can be prevented from straying outside the press-wrapping tape.

===Reference Explanation: Optical Cable 1===

FIG. 1 is a cross-section of the optical cable 1. The optical cable 1 includes the optical fiber bundle 2, the press-wrapping tape 3, and an outer cover 5.

The optical fiber bundle 2 is configured from a plurality of optical fibers 2B. In this case, the optical fiber bundle is formed by line-concentrating four of the intermittently-fixed optical fiber tapes 2A. Each of the intermittently-fixed optical fiber tapes 2A is configured with four cores, and the optical fiber bundle 2 is configured from a total of 16 optical fibers 2B.

Figure 2:
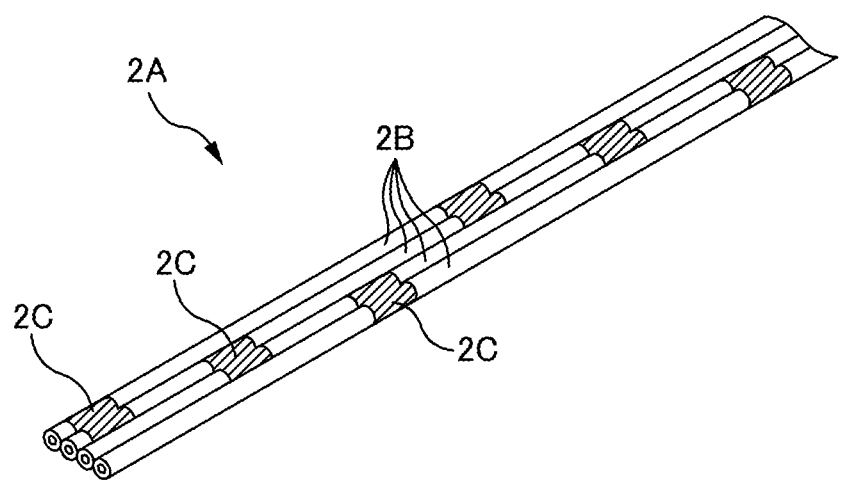
FIG. 2 is an explanatory diagram of an intermittently-fixed optical fiber tape 2A.

FIG. 2 is an explanatory diagram of an intermittently-fixed optical fiber tape 2A. The intermittently-fixed optical fiber tape 2A is an optical fiber tape 2A in which connection parts 2C connecting between adjacent optical fibers 2B are intermittently disposed in the length direction and the width direction of the optical fibers 2B, respectively.

The intermittently-fixed optical fiber tape 2A is configured from three or more cores of the optical fibers 2B (optical fiber cores) that are arranged parallel to each other. The plurality of the connection parts 2C connecting two adjacent cores of the optical fibers 2B to each other are intermittently disposed in two dimensions: the length direction and the width direction. The connection parts 2C are each a location where a connection is made between two adjacent cores of the optical fibers 2B by, for example, an ultraviolet curing resin or a thermoplastic resin. The regions other than where the connection parts 2C are present between two adjacent cores of the optical fibers 2B are non-connecting parts. At the non-connecting parts, the two adjacent cores of the optical fibers 2B are not bound by each other. This thereby enables the intermittently-fixed optical fiber tape 2A to be rolled up into a cylinder shape (bundle shape) or stored folded onto itself, enabling a high density of the optical fibers 2B to be packed in the optical cable 1.

Note that the optical fiber bundle 2 is not limited to being configured from the intermittently-fixed optical fiber tapes 2A. For example, instead of being configured from the intermittently-fixed optical fiber tapes 2A, configuration may be made from a plurality of (for example, sixteen) single optical fibers 2B. Moreover, there is also no limitation to sixteen as the number of the optical fibers 2B configuring the optical fiber bundle 2.

The press-wrapping tape 3 is a member for wrapping the optical fiber bundle 2. Inside the optical cable 1, the press-wrapping tape 3 has a helical shape, and includes an overlap section 3A where two edge portions in the width direction of the press-wrapping tape 3 overlap with each other. A method for forming the press-wrapping tape 3 in such a manner is described later.

A polyimide tape, a polyester tape, a polypropylene tape, a polyethylene tape, or the like is employed for the press-wrapping tape 3. Other than these, a non-woven fabric may also be utilized as the press-wrapping tape 3. In such cases, the non-woven fabric employed is formed by making a polyimide, a polyester, a polypropylene, a polyethylene, or the like into a tube shape. Note that the non-woven fabric may be a non-woven fabric that has been adhered or coated with a water absorbent powder or the like, or a non-woven fabric that has been subjected to surface treatment for this purpose. The press-wrapping tape 3 may be a non-woven fabric with a film, such as a polyester film, stuck thereon.

The optical fiber bundle 2 wrapped in the press-wrapping tape 3 is sometimes referred to as an optical fiber unit 4. The optical fiber unit 4 includes a plurality of the optical fiber bundles 2 and the press-wrapping tape 3, with the press-wrapping tape 3 wrapping the plurality of optical fiber bundles 2. Sometimes each of the optical fiber bundles 2 is bound by a bundling member (identification member).

The outer cover 5 is a member covering such that the optical fiber unit 4 (the optical fiber bundle 2 and the press-wrapping tape 3) is contained within. Tensile strength bodies 6 and tear strings 7 are provided in the outer cover 5. The tensile strength bodies 6 are members that resist shrinkage of the outer cover 5, and suppress distortion and bending imparted to the optical cable 1 by shrinkage of the outer cover 5. A pair of the tensile strength bodies 6 is provided within the outer cover 5 so as to be disposed sandwiching the press-wrapping tape 3. The tear strings 7 are members employed when tearing the outer cover 5 of the optical cable 1 along its length direction during operations to branch the optical cable 1. In this case, a pair of the tear strings 7 is provided within the outer cover 5 so as to be disposed sandwiching the press-wrapping tape 3, on a line orthogonal to a line connecting between the pair of tensile strength bodies 6.

Note that the outer cover 5 does not necessarily include the tensile strength bodies 6 and the tear strings 7. Either, or both, of the tensile strength bodies 6 and the tear strings 7, may be omitted from inside the outer cover 5. Another member may also be disposed inside the outer cover 5.

In this case, there is a single optical fiber unit 4 contained in the outer cover 5; however, there may be a plurality of the optical fiber units 4 contained in the outer cover 5.

Figure 3:
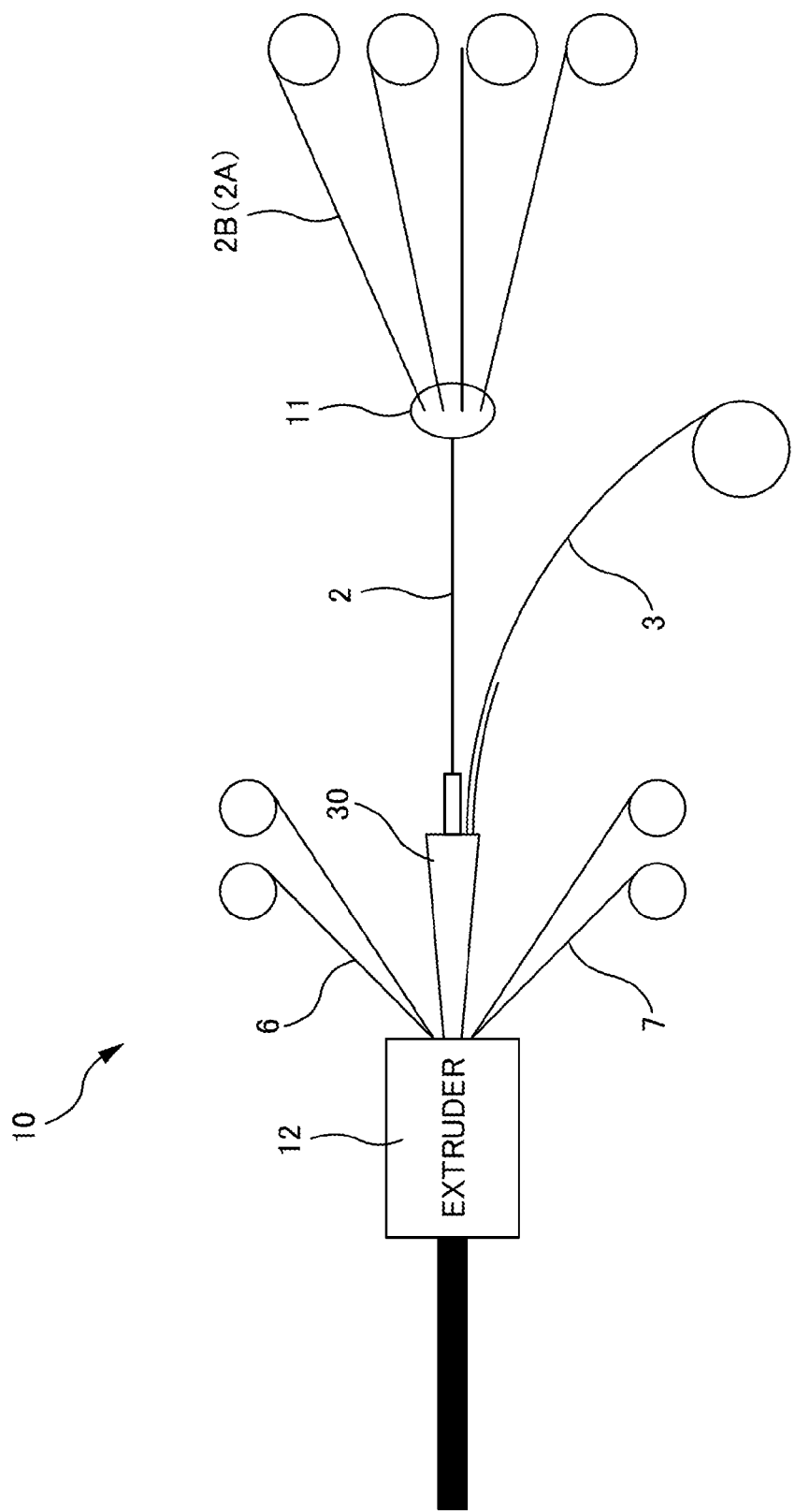
FIG. 3 is a process diagram of a manufacturing device 10 of the optical cable 1.

FIG. 3 is a process diagram of a manufacturing device 10 of the optical cable 1.

The four tapes of the intermittently-fixed optical fiber tape 2A are fed into a collector unit 11. The optical fiber bundles 2 that are line-concentrated in the collector unit 11 are fed into a guide pipe 40 (described later) of a former 30. The press-wrapping tape 3 that has been wound in a planar coil is fed into a tape forming section 50 (described later) of the former 30. As described later, in the former 30, the optical fiber unit 4 (the optical fiber bundle 2 and the press-wrapping tape 3) is formed by wrapping the optical fiber bundle 2 in the press-wrapping tape 3 while guiding the optical fiber bundle 2, and the optical fiber unit 4 is fed into an extruder 12.

The optical fiber unit 4, the two tensile strength bodies 6, and the two tear strings 7, are fed into the extruder 12. The extruder 12 causes the optical fiber unit 4 to run as the tensile strength bodies 6 and the tear strings 7 are being drawn out from their respective feed sources, and covers the periphery of the optical fiber unit 4 with the outer cover 5. The sixteen core optical cable 1 illustrated in FIG. 1 is manufactured in this manner. The manufactured optical cable 1 is wound onto a drum (not illustrated in the drawings).

Former 30 of First Embodiment

Figure 5A:
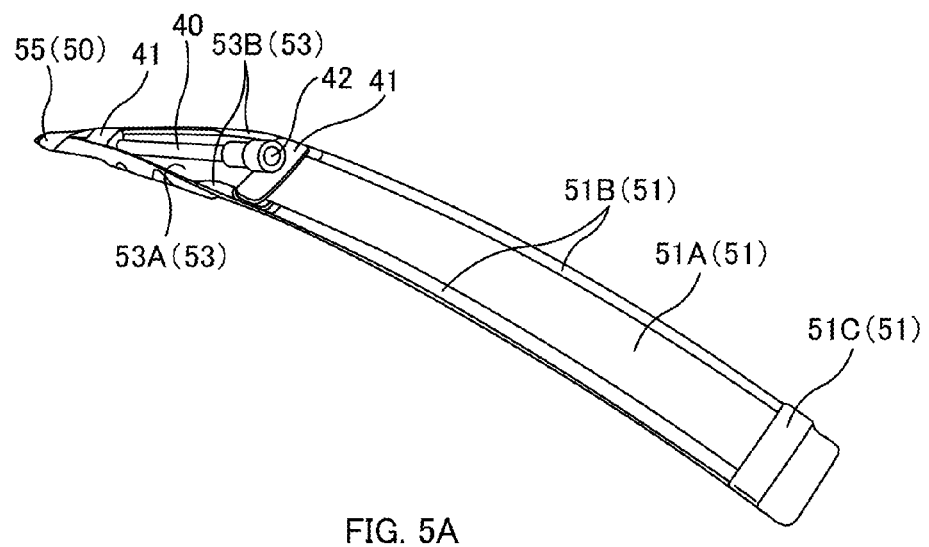
FIG. 5A is a perspective view of the former 30.
Figure 5B:
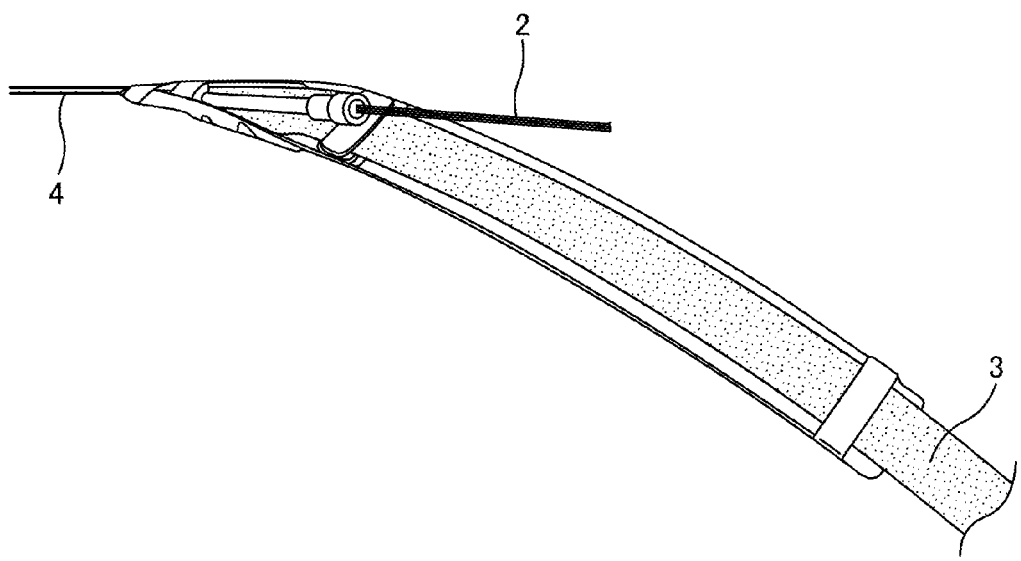
FIG. 5B is an explanatory diagram of a manner in which an optical fiber bundle 2 and a press-wrapping tape 3 are fed into the former 30.

FIG. 4A is a diagram of a former 30 of a first embodiment, as viewed from above. FIG. 4B is a side view of the former 30. FIG. 5A is a perspective view of the former 30. FIG. 5B is an explanatory diagram of a manner in which the optical fiber bundle 2 and the press-wrapping tape 3 are fed into the former 30. Speckled hatching has been applied to the press-wrapping tape 3 in FIG. 5B.

In the following explanation each direction is defined, as illustrated in FIG. 4A and FIG. 4B. Namely, a direction parallel to the optical fiber bundle 2 as it is being fed into the former 30 is taken as the "front-rear direction", with the side of the feed sources of the optical fiber bundle 2 taken as the "rear", and the opposite side taken as the "front", as viewed from the former 30. The feed source side according to the feed direction of the optical fiber bundle 2 (a direction from the rear toward the front: fiber feed direction) is referred to as "upstream", and the feed destination side is referred to as "downstream". The width direction of the strip shaped press-wrapping tape 3 of the former 30 is taken as the "left-right direction", with the right side taken as the "right" and the opposite side taken as the "left", as viewed from the front side. A direction orthogonal to the front-rear direction and to the left-right direction is taken as the "up-down direction", with the side of the guide pipe 40 at the rear side of the former 30 taken as "up" and the side of the tape forming section 50 taken as "down". Note that according to a feed direction of the press-wrapping tape 3 (a tape feed direction), the side of the feed source of the press-wrapping tape 3 is referred to as the "upstream", and the feed destination side is referred to as the "downstream".

The former 30 is a tool for wrapping the optical fiber bundle 2 in the press-wrapping tape 3 while guiding the optical fiber bundle 2. The former 30 includes the guide pipe 40 and the tape forming section 50.

The guide pipe 40 is a tube shaped member that guides the optical fiber bundle 2 along the fiber feed direction. In this case, the guide pipe 40 is configured from a metal pipe; however, it may be configured from another substance. An inlet 42 (feed port) for the optical fiber bundle 2 is present at the rear side of the guide pipe 40, and an outlet 43 (see FIG. 8A) that acts as the discharge port for the optical fiber bundle 2 is present at the front side of the guide pipe 40.

Inside the guide pipe 40, the diameter of the optical fiber bundle 2 does not widen, due to the optical fiber bundle 2 being constrained by the inner wall of the guide pipe 40. The diameter of the optical fiber bundle 2 immediately after exiting from the outlet 43 of the guide pipe 40 is also substantially the same as the internal diameter of the guide pipe 40. The guide pipe 40 accordingly functions in this manner to suppress the diameter of the optical fiber bundle 2 from widening.

Suppose that an attempt were made to wrap the optical fiber bundle 2 in the press-wrapping tape 3 in a state in which the guide pipe 40 is omitted, then there would be a possibility that the optical fibers 2B might become pinched in the overlap section 3A of the helical shaped press-wrapping tape 3, or stray outside the press-wrapping tape 3. This might, as a result, lead to impairment of the transmission properties of the optical fibers 2B, or, in the worst case, to the optical fibers 2B being severed. Thus the guide pipe 40 functions in this manner to suppress the optical fibers 2B from intruding into the overlap section 3A of the helical shaped press-wrapping tape 3.

The tape forming section 50 is a member that forms the press-wrapping tape 3 from a strip shape into a helical shape while guiding the press-wrapping tape 3 along the tape feed direction. The guide section 51, a curved section 53, and a helical section 55 are provided to the tape forming section 50, in sequence from the upstream side in the tape feed direction. Note that, as viewed from above the tape forming section 50, the curved section 53 refers to a location further to the upstream side than a position X where the left and right edges of the tape forming section 50 intersect with each other (see FIG. 4A), and the helical section 55 refers to a location further to the downstream side than the position X.

The guide section 51 is a location that guides the strip shaped press-wrapping tape 3 as far as the curved section 53, and includes a guide face 51A having a width substantially the same as the press-wrapping tape 3.

The guide section 51 is formed in a curve such that the nearer to the rear side, the further away the press-wrapping tape 3 is from the optical fiber bundle 2. This thereby enables the feed source of the optical fiber bundle 2 to be disposed separated from the feed source of the press-wrapping tape 3. The reason the feed path of the optical fibers 2B is set in a straight line is in order to suppress impairment of the transmission properties of the optical fibers 2B.

A turn-back fold 51B is formed at each of the left and right edges of the guide section 51. The edges in the left-right direction of the press-wrapping tape 3 (the left-right direction) are restrained on the guide section 51 by the turn-back folds 51B. A hold-down section 51C is formed at the upstream side and at the downstream side of the guide section 51. The hold-down section 51C prevents the press-wrapping tape 3 from lifting up away from the guide face 51A by pinching the press-wrapping tape 3 against the guide face 51A of the guide section 51. Note that a back tension is applied to the press-wrapping tape 3 as it is being fed into the tape forming section 50, and lifting up of the press-wrapping tape 3 is prevented by the back tension.

In this case, the guide section 51 is provided at the upstream side of the tape forming section 50; however, it is possible to configure the tape forming section 50 from the curved section 53 and the helical section 55, without providing the guide section 51. However, feeding of the press-wrapping tape 3 into the curved section 53 is smoother when the guide section 51 is provided.

The curved section 53 is a location that gradually curves the strip shaped press-wrapping tape 3, while guiding the press-wrapping tape 3 along the tape feed direction. An inner face 53A of the curved section 53 is an extension face of the guide face 51A of the guide section 51. A cross-section of the curved section 53 in a plane orthogonal to the front-rear direction is C-shaped, and the strip shaped press-wrapping tape 3 runs along the inner face 53A of the curved section 53 and gradually curves into a C-shape. When viewed from above the curved section 53, as illustrated in FIG. 4A, the left and right edges approach each other on progression toward the front side.

Since the curved section 53 is a location further to the upstream side than the position X where the left and right edges intersect (see FIG. 4A), the upper side of the curved section 53 is open. The guide pipe 40 is disposed in this open region. The guide pipe 40 is fixed to the tape forming section 50 at two sites further to the upstream side than the position X (see FIG. 4A). A fixing part 41 at the upstream side of the guide pipe 40 is positioned on the upper faces of the turn-back folds 51B of the guide section 51. This thereby enables the guide pipe 40 to be fixed to the guide section 51, without contacting the guide face 51A of the guide section 51. Moreover, the fixing part 41 at the downstream side of the guide pipe 40 is a location where the left and right edges of the curved section 53 approach each other at the upper side. This thereby enables the guide pipe 40 to be fixed without contacting the inner face 53A of the curved section 53. Note that an end portion at the outlet 43 side of the guide pipe 40 projects out further to the downstream side than the fixing part 41, and is inserted into the helical section 55. This thereby enables the outlet 43 of the guide pipe 40 to be disposed further to the downstream side than the position X (see FIG. 4A).

Turn-back folds 53B are also formed at the left and right edges of the curved section 53. The press-wrapping tape 3 inside the curved section 53 is restricted from moving in directions other than the feed direction by the curved section 53. The turn-back folds 53B of the curved section 53 are extensions of the turn-back folds 51B of the guide section 51.

The turn-back folds 53B of the curved section 53 are not formed further to the downstream side than the fixing part 41 at the downstream side of the guide pipe 40. However, due to the two edges of the press-wrapping tape 3 being continuously restrained further to the upstream side thereof, misalignment of the press-wrapping tape 3 in the curved section 53 and the helical section 55 is prevented even though the turn-back folds 53B are not present.

Figure 6A:
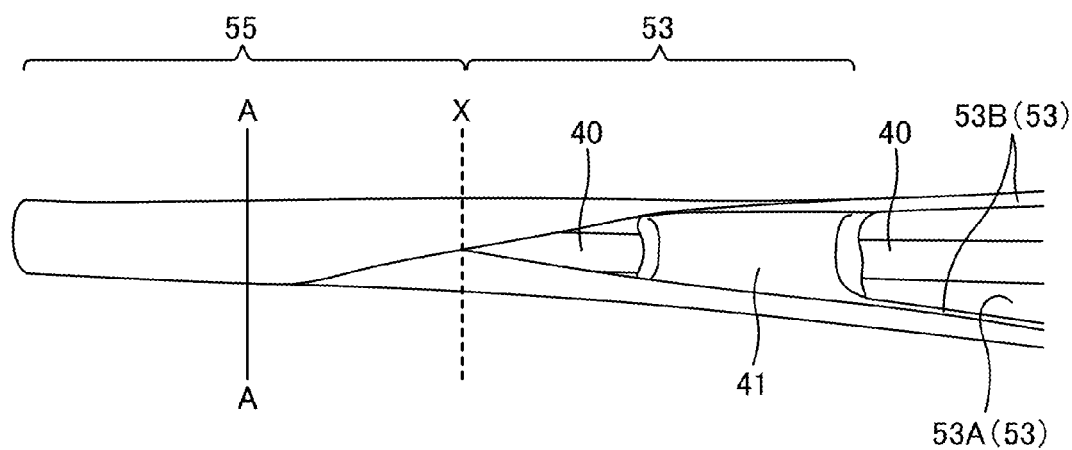
FIG. 6A is a diagram illustrating a helical section 55, as viewed from above.
Figure 6B:
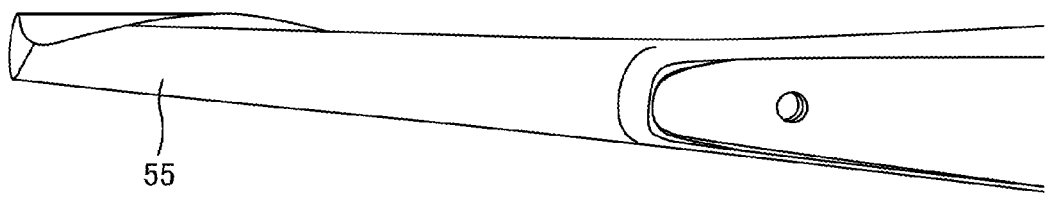
FIG. 6B is a diagram of the helical section 55, as viewed from below.
Figure 7A:
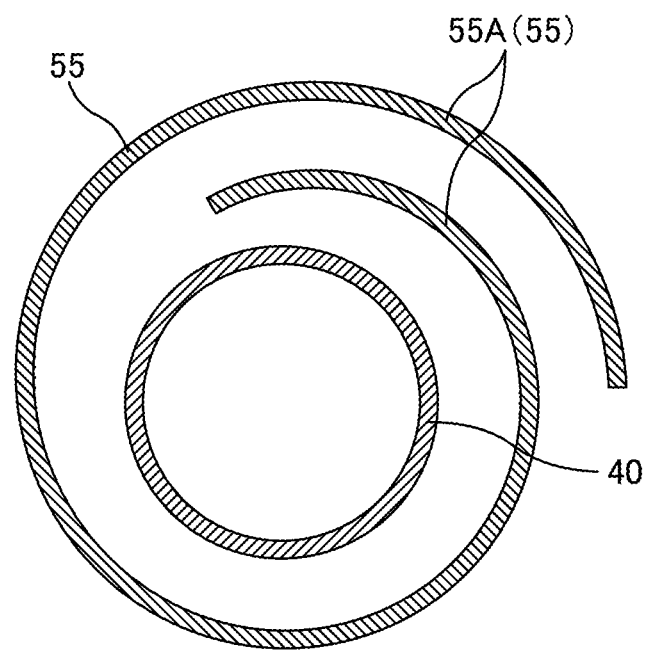
FIG. 7A and FIG. 7B are cross-sections taken along line A-A of FIG. 6A.
Figure 7B:
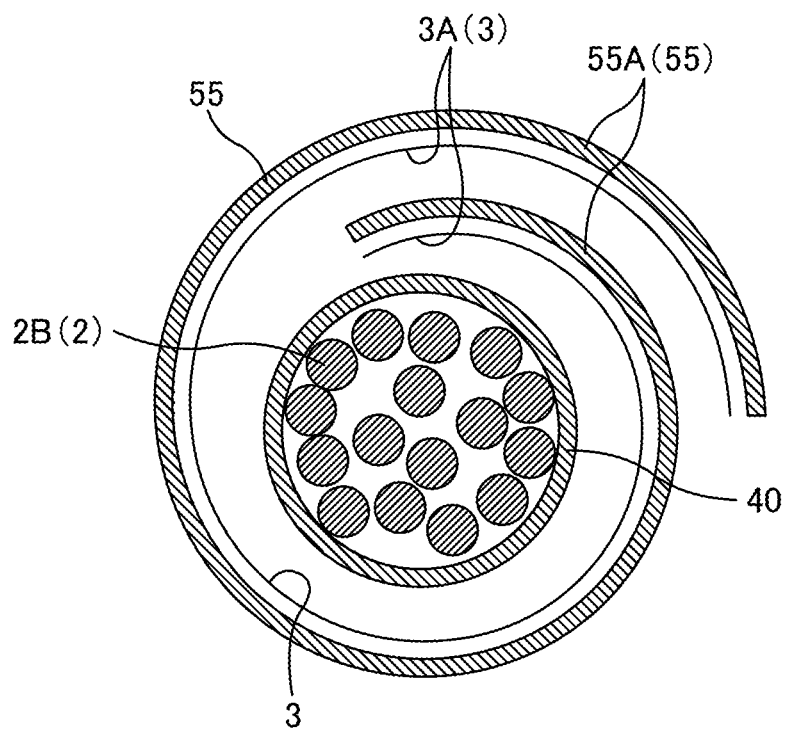

FIG. 6A is a diagram of the helical section 55, as viewed from above. FIG. 6B is a diagram of the helical section 55, as viewed from below. FIG. 7A and FIG. 7B are cross-sections taken along line A-A of FIG. 6A. FIG. 7A is a cross-section illustrating a state in which the optical fiber bundle 2 and the press-wrapping are not present. FIG. 7B is a cross-section illustrating a state in which the optical fiber bundle 2 and the press-wrapping are present (during manufacture of the optical cable 1).

The helical section 55 is a helical tube-shape location further to the downstream side than the position where the two edges of the curved section 53 intersect (position X in FIG. 4A). The inner face of the helical section 55 is an extension face of the inner face of the curved section 53, and guides the press-wrapping tape 3 along the tape feed direction. In this case, the helical section 55 (and the curved section 53) is configured by machining the front side of a metal sheet configuring the guide section 51 into a helical tube-shape. The helical section 55 further to the downstream side than the position X where the left and right edges intersect (see FIG. 4A) is formed such that the edge on the right side is on the inside, and the edge on the left side is on the outside.

As illustrated in FIG. 7A, the helical section 55 is formed with an overlap section 55A where the two edge portions of the helical section 55 overlap with each other. In the overlap section 55A, a gap is formed such that the outside face of the end portion on the inside does not contact the inner face of the end portion on the outside. Part of the press-wrapping tape 3 (the overlap section 3A of the press-wrapping tape 3) passes through this gap, as illustrated in FIG. 7B. Due to the press-wrapping tape 3 passing through the helical section 55 provided with such an overlap section 55A, the press-wrapping tape 3 is formed running along the helical shaped inner face of the overlap section 55A, the two end portions of the press-wrapping tape 3 are formed into an overlap, and the press-wrapping tape 3 is formed into a helical shape having the overlap section 3A.

The helical section 55 is a tapered helical pipe, with the external diameter gradually narrowing toward the front side. Thus when the press-wrapping tape 3 is being fed toward the downstream side, the helical shaped press-wrapping tape 3 is formed with a gradually narrowing external diameter. The press-wrapping tape 3 that has been formed into a helical shape is then discharged from the front end of the helical section 55, and fed into the extruder 12.

Due to the press-wrapping tape 3 being discharged from the tapered helical section 55, the overlap ratio (the proportion occupied by the press-wrapping tape with respect to the circumference: for example, 100% if there is one turn, 200% if there are two turns (a double layer), of the press-wrapping tape) increases towards the leading end. Immediately after the press-wrapping tape 3 is discharged from the helical section 55, the press-wrapping tape 3 is even slightly narrower (the press-wrapping tape 3 is squeezed) in external profile than the inner face of the helical section 55. A gap between the press-wrapping tape 3 and the optical fiber bundle 2 is thereby narrowed, enabling a narrower diameter to be achieved for the optical fiber unit 4 (the optical fiber bundle 2 and the press-wrapping tape 3), and enabling a narrower diameter to be achieved for the optical cable 1.

Moreover, tension is applied to the press-wrapping tape 3 being discharged from the helical section 55. Due to the tapered press-wrapping tape 3 being discharged from the tapered helical section 55 in a tension-applied state, the state in which the optical fiber bundle is wrapped in the press-wrapping tape is maintained even after being discharged from the helical section. This thereby enables the optical fiber bundle to be prevented from straying outside the press-wrapping tape.

The helical section 55 is not provided with the turn-back folds that are provided at the left and right edges of the guide section 51 and the curved section 53. This thereby enables a gap between the edge on the outside and the edge on the inside of the helical section 55 (see FIG. 7A and FIG. 7B: the gap of the overlap section 55A) to become narrow, and enables a gap between the overlap sections 3A of the press-wrapping tape 3 that has been formed into a helical shape to become narrow. Due to narrowing of the gap between the edge on the outside of the helical shaped press-wrapping tape 3 and the outer peripheral face of the press-wrapping tape 3 at the inside thereof, the helical shaped press-wrapping tape 3 is less liable to open out. Due to narrowing of the gap between the edge on the inside of the helical shaped press-wrapping tape 3 and the inner peripheral face of the press-wrapping tape 3 at the outside thereof, the optical fibers 2B configuring the optical fiber bundle 2 are less liable to intrude into the overlap section 3A of the press-wrapping tape 3, and, as a result, transmission properties of the optical fibers 2B can be suppressed from being impaired.

Figure 8A:
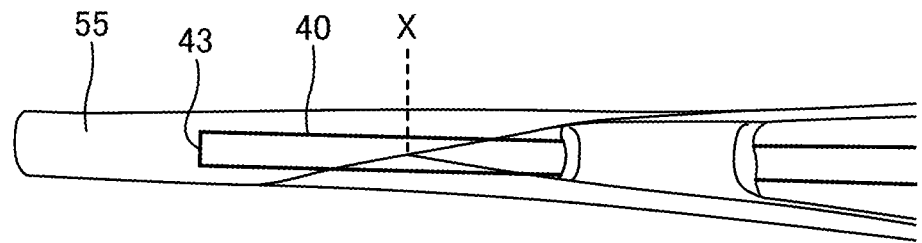
FIG. 8A is an explanatory diagram of placement of an outlet 43 of a guide pipe 40 of the first exemplary embodiment.

FIG. 8A is an explanatory diagram of placement of the outlet 43 of the guide pipe 40 in the first embodiment. In the drawings, the external profile of the helical section 55 is indicated by thin lines, the helical section 55 is made transparent, and the external profile of the guide pipe 40 is indicated by bold lines.

As illustrated in the diagrams, the outlet 43 of the guide pipe 40 is disposed further toward the downstream side than the position X where the two edges of the curved section 53 intersect, and disposed further toward the downstream side than the position in the helical section 55 where the two width direction edges of the press-wrapping tape 3 intersect. Namely, the guide pipe 40 is inserted into the helical section 55, and is inserted into the helical shaped press-wrapping tape 3 formed with the overlap section 3A. Hence, when the optical fiber bundle 2 is discharged from the outlet 43 of the guide pipe 40, the optical fiber bundle 2 is in a state wrapped in the press-wrapping tape 3. In other words, the optical fiber bundle 2 is fed into the center of the press-wrapping tape 3 that has been formed into the helical shape. As a result, the optical fibers 2B are less liable to intrude into the overlap section 3A of the press-wrapping tape 3. Note that due to the present embodiment not requiring a heating means (for example, a heater) to curl the press-wrapping tape 3 formed into the helical shape, the configuration of the manufacturing device can be made smaller, enabling a lower cost and a saving in space to be achieved.

Moreover, in the first embodiment, the outlet 43 of the guide pipe 40 is disposed further to the upstream side than the front end (the end portion at the downstream side) of the helical section 55. It is accordingly possible to make the internal diameter of the front end of the helical section 55 (the maximum diameter of an inscribed circle to the inner face of the helical section 55) narrower. In particular, in the first embodiment, due to disposing the outlet 43 of the guide pipe 40 further to the upstream side than the front end of the helical section 55, the internal diameter of the front end of the helical section 55 is narrower than the external diameter of the guide pipe 40. This thereby enables the gap between the press-wrapping tape 3 and the optical fiber bundle 2 to be narrowed.

Figure 8B:
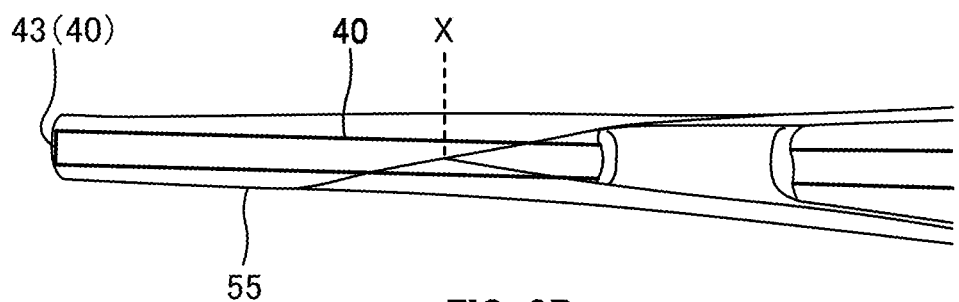
FIG. 8B is an explanatory diagram of a first modified example of placement of the outlet 43 of the guide pipe 40.

FIG. 8B is an explanatory diagram of a first modified example of placement of the outlet 43 of the guide pipe 40. In the first modified example, the outlet 43 of the guide pipe 40 is disposed at the same position as the front end of the helical section 55. Thus also in the first modified example, the outlet 43 of the guide pipe 40 is disposed further toward the downstream side than the position X where the two edges of the curved section 53 intersect, and disposed further toward the downstream side than the position in the helical section 55 where the two width direction edges of the press-wrapping tape 3 intersect. The optical fibers 2B are accordingly less liable to intrude into the overlap section 3A of the press-wrapping tape 3.

However, in the first modified example, the internal diameter of the front end of the helical section 55 must be made larger than the external diameter of the outlet 43 of the guide pipe 40. It is accordingly difficult to narrow the gap between the press-wrapping tape 3 and the optical fiber bundle 2. However, due to the helical section 55 being a tapered helical pipe, the press-wrapping tape 3 is slightly squeezed immediately after being discharged from the helical section 55, thereby enabling the gap between the press-wrapping tape 3 and the optical fiber bundle 2 to be narrowed.

Figure 8C:
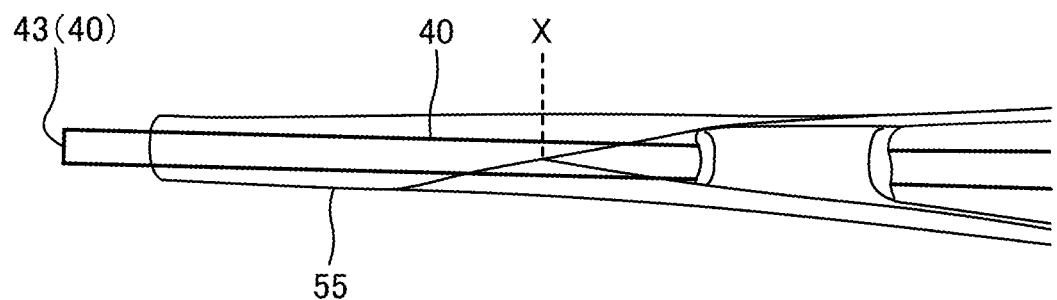
FIG. 8C is an explanatory diagram of a second modified example of placement of the outlet 43 of the guide pipe 40.

FIG. 8C is an explanatory diagram of a second modified example of placement of the outlet 43 of the guide pipe 40. In the second modified example, the outlet 43 of the guide pipe 40 is disposed further toward the downstream side than the front end of the helical section 55. The second modified example also enables the advantageous effect of the optical fibers 2B not being liable to intrude into the overlap section 3A of the press-wrapping tape 3 to be exhibited. In the second modified example, however, due to the guide pipe 40 projecting out from the front end of the helical section 55 to the downstream side, the press-wrapping tape 3 is not squeezed immediately after being discharged from the helical section 55 even though the helical section 55 is a tapered helical tube shape, and this therefore makes it difficult to obtain an advantageous effect in which the gap between the press-wrapping tape 3 and the optical fiber bundle 2 is narrowed.

Second Embodiment

Figure 9A:
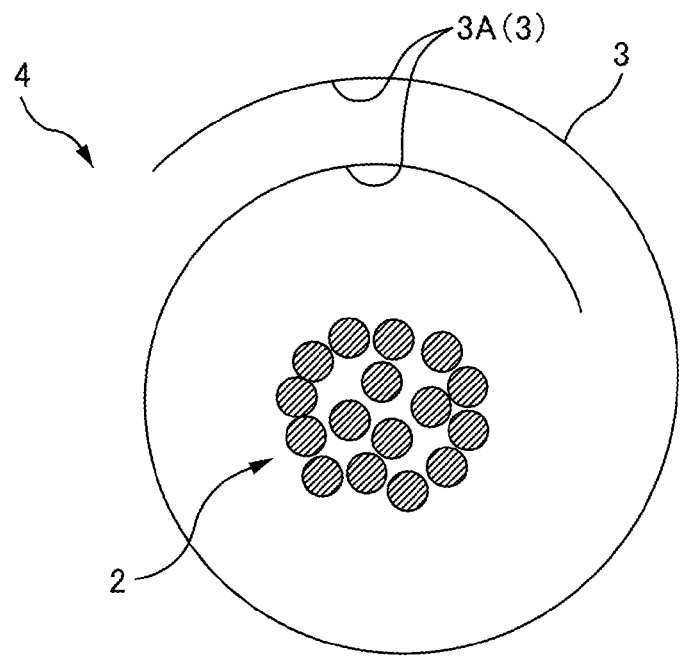
FIG. 9A is an explanatory diagram of cases in which a gap between the press-wrapping tape 3 and the optical fiber bundle 2 is large.
Figure 9B:
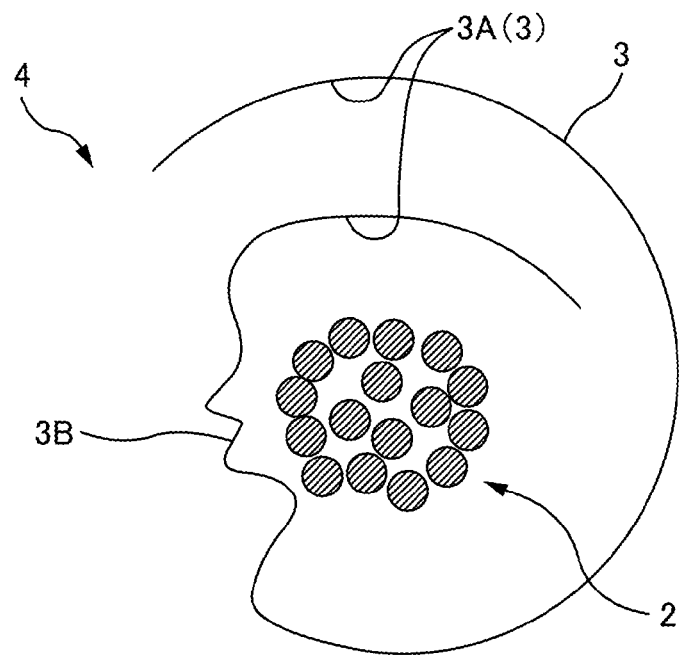
FIG. 9B is an explanatory diagram of cases in which creases 3B have developed in the press-wrapping tape 3.

In the first embodiment, at the position of the outlet 43 of the guide pipe 40, it is necessary to make the internal diameter of the helical section 55 larger than the external diameter of the outlet 43 of the guide pipe 40. Namely, in the first embodiment, the internal diameter of the helical section 55 is limited by the external diameter of the guide pipe 40, making it difficult to achieve a narrower diameter. As a result, the gap between the press-wrapping tape 3 and the optical fiber bundle 2 becomes larger, with the optical fiber unit 4 (the optical fiber bundle 2 and the press-wrapping tape 3) becoming fatter (see FIG. 9A). If the optical fiber unit 4 is tightened from the outside when covering with the outer cover 5 in a state in which there is a wide gap between the press-wrapping tape 3 and the optical fiber bundle 2, then creases 3B develop in the press-wrapping tape 3 (see FIG. 9B), and pressure from the creases 3B acts on the optical fibers 2B, giving rise to a possibility that the transmission properties of the optical fibers 2B might be adversely affected.

In contrast thereto, in the second embodiment, the leading end of the guide pipe 40 is configured with an oblique cut, achieving a helical section 55 with a narrower diameter.

Figure 10A:
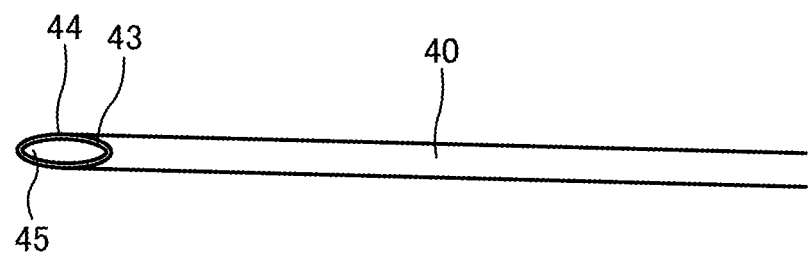
FIG. 10A is an explanatory diagram of an outlet 43 of a guide pipe 40 of a second embodiment.
Figure 10B:
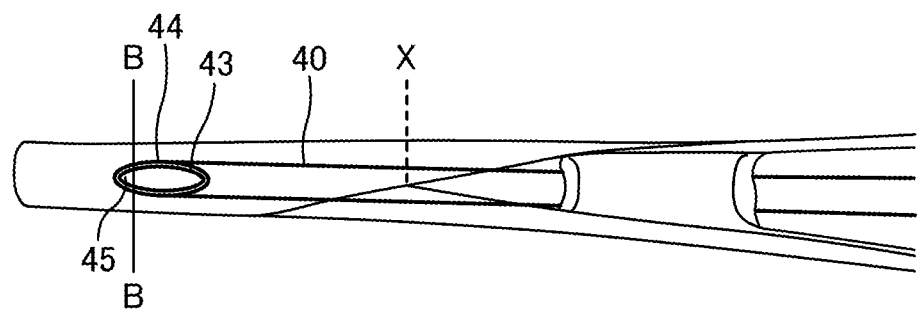
FIG. 10B is an explanatory diagram of placement of the outlet 43 of the guide pipe 40 of the second embodiment.
Figure 10C:
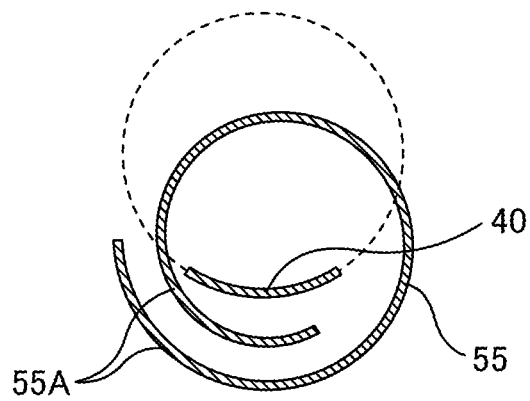
FIG. 10C is a cross-section taken along B-B of FIG. 10B.

FIG. 10A is an explanatory diagram of the outlet 43 of the guide pipe 40 of the second embodiment. FIG. 10B is an explanatory diagram of placement of the outlet 43 of the guide pipe 40 in the second embodiment. In FIG. 10B, the external profile of the helical section 55 is indicated by thin lines, the helical section 55 is made transparent, and the external profile of the guide pipe 40 is indicated by bold lines. FIG. 10C is a cross-section taken along line B-B of FIG. 10B (a cross-section further toward the downstream side than a central position of an opening 44). The circle indicated by the dashed line in FIG. 10C shows the external profile of the guide pipe 40.

As illustrated in FIG. 10A, the leading end of the guide pipe 40 in the second embodiment is cut obliquely. In the following explanation, this elliptical shaped opening is referred to as "opening 44". The optical fiber bundle 2 that has passed through the guide pipe 40 is exposed from the upstream end of the opening 44, and the position at the upstream end of the opening 44 is referred to as "outlet 43" of the guide pipe 40. The location (pointed location) of the guide pipe 40 further to the downstream side than the outlet 43 is referred to as "leading end portion 45".

As illustrated in FIG. 10B, in the second embodiment too, the outlet 43 of the guide pipe 40 is disposed further toward the downstream side than the position X where the two edges of the curved section 53 intersect, and disposed further toward the downstream side than the position in the helical section 55 where the two width direction edges of the press-wrapping tape 3 intersect. Thus also in the second embodiment, the optical fibers 2B are less liable to intrude into the overlap section 3A of the press-wrapping tape 3.

Also in the second embodiment, at the position of the outlet 43 of the guide pipe 40, it is necessary to make the internal diameter of the helical section 55 (the maximum diameter of an inscribed circle to the inner face of the helical section 55) larger than the external diameter of the guide pipe 40. However, in the second embodiment, the width of the leading end portion 45 is smaller than the external diameter of the outlet 43 of the guide pipe 40 further to the downstream side than the central position of the opening 44 (for example, a position on line B-B of FIG. 10B), and so, at this position (at the leading end portion 45 further to the downstream side than the central position of the opening 44), it is possible for the internal diameter of the helical section 55 to be made smaller than the external diameter of the guide pipe 40.

As illustrated in FIG. 10C, in the second embodiment, the leading end portion 45 of the guide pipe 40 is disposed at the inside of the helical section 55 having an internal diameter smaller than the external diameter (dashed line in the drawing) of the guide pipe 40. This thereby enables the helical section 55 to be made narrower in diameter while guiding the optical fiber bundle 2 using the leading end portion 45 of the guide pipe 40. As a result, the gap can be narrowed between the press-wrapping tape 3 and the optical fiber bundle 2.

Moreover, as illustrated in FIG. 10C, the leading end portion 45 of the guide pipe 40 is disposed between the edge at the inside of the helical section 55 (or at the edge at the inside of the helical shaped press-wrapping tape 3), and the optical fiber bundle 2. In other words, the outer face of the leading end portion 45 of the guide pipe 40 is disposed facing the edge at the inside of the helical section 55, so as to block intrusion of the optical fibers 2B into the overlap section 55A of the helical section 55 (or the overlap section 3A of the press-wrapping tape 3). Thus, even after the optical fiber bundle 2 is exposed from the outlet 43 of the guide pipe 40, the optical fibers 2B are suppressed from intruding into the overlap section 3A of the press-wrapping tape 3. Moreover, although there is a possibility that the optical fibers 2B may be damaged, or in the worst case that the optical fibers 2B may be severed, by the helical section 55 in the case where the optical fibers 2B were to intrude into the overlap section 55A of the helical section 55, in the second embodiment, such damage to the optical fibers 2B is also suppressed.

Figure 11A:
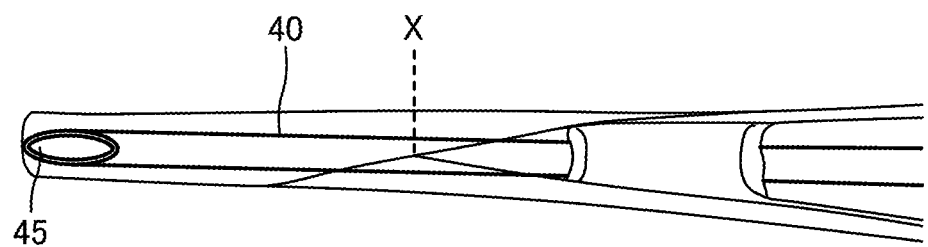
FIG. 11A is an explanatory diagram of a first modified example of the second embodiment.

FIG. 11A is an explanatory diagram illustrating a first modified example of the second embodiment. In the first modified example, the furthest downstream end of the leading end portion 45 of the guide pipe 40 is disposed at the same position as the front end of the helical section 55. However, in the first modified example of the second embodiment, in contrast to the first modified example of the first embodiment described above (see FIG. 8B), even though the furthest downstream end of the guide pipe 40 is disposed at the same position as the front end of the helical section 55, the internal diameter of the front end of the helical section 55 can still be made narrower, enabling the helical section 55 to be made with a narrower diameter.

Figure 11B:
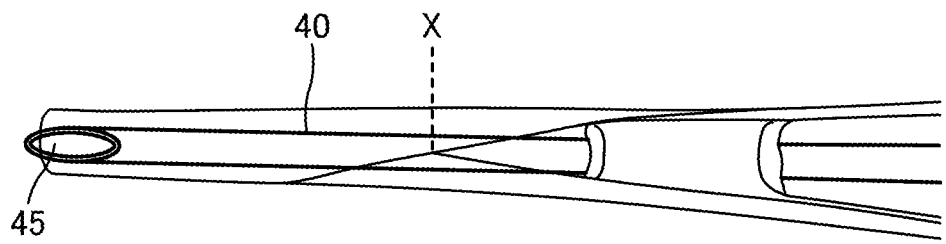
FIG. 11B is an explanatory diagram of a second modified example of the second embodiment.

FIG. 11B is an explanatory diagram of a second modified example of the second embodiment. In the second modified example, the furthest downstream end of the leading end portion 45 of the guide pipe 40 is disposed further to the downstream side than the front end of the helical section 55. However, in the second modified example of the second embodiment, in contrast to the second modified example of the first embodiment described above (see FIG. 8C), it is possible to make the internal diameter at the front end of the helical section 55 narrower than the external diameter of the guide pipe 40 by the central position of the opening 44 being further to the upstream side than the front end of the helical section 55.

The helical shaped press-wrapping tape 3 preferably has 1.5 turns or more (an overlap ratio of 150% or greater). This is because the press-wrapping tape 3 shrinks with heating during extrusion molding of resin for the outer cover 5 in the extruder 12 (see FIG. 3), and a possibility accordingly arising of the optical fibers 2B straying outside the shrunk press-wrapping tape 3 when the outer cover 5 is removed during mid-span accessing in the case where the overlap ratio of the press-wrapping tape 3 is less than 150%. Regarding this point, when implementing the second modified example of the second embodiment, due to an overlap ratio of 150% or greater being achievable (due to being able to form the helical shaped press-wrapping tape 3 with 1.5 turns or greater), the optical fiber bundle 2B can, to a large extent, be suppressed from straying outside the press-wrapping tape 3 after mid-span accessing.

Moreover, in the second modified example of the second embodiment, the leading end portion 45 has a tapered shape projecting out from the front end of the helical section 55 toward the downstream side. Thus in the second modified example of the second embodiment, in contrast to the second modified example of the first embodiment described above, the press-wrapping tape 3 is squeezed immediately after being discharged from the helical section 55, and it is accordingly possible to obtain an effect in which a gap between the press-wrapping tape 3 and the optical fiber bundle 2 is narrowed.

Note that also in the second modified example of the second embodiment, the state in which the optical fiber bundle is wrapped in the press-wrapping tape is maintained by applying tension to the press-wrapping tape 3, even after being discharged from the helical section. This thereby enables the optical fiber bundle to be prevented from straying outside the press-wrapping tape.

===Others===

The foregoing embodiments are for facilitating the understanding of the present invention, and are not to be construed as to limit the present invention. Needless to say, the present invention may be modified and/or improved without departing from the gist thereof, and the present invention encompasses equivalents thereof.

REFERENCE SIGNS LIST

1: optical cable; 2: optical fiber bundle;
2A: intermittently-fixed optical fiber tape;
2B: optical fibers; 2C: connection parts;
3: press-wrapping tape;
3A: overlap section (press-wrapping tape); 3B: creases;
4: optical fiber unit; 5: outer cover;
6: tensile strength body; 7: tear string;
10: manufacturing device; 11: collector unit; 12: extruder;
30: former; 40: guide pipe;
41: fixing part; 42: inlet; 43: outlet;
44: opening; 45: leading end portion;
50: tape forming section; 51: guide section;
51A: guide face; 51B: turn-back fold; 51C: hold-down section;
53: curved section; 53A: inner face; 53B: turn-back fold;
55: helical section; 55A: overlap section (helical section).

The invention claimed is:

1. A former comprising:
   a guide pipe that guides an optical fiber bundle configured from a plurality of optical fibers;
   a tape forming section that forms a press-wrapping tape from a strip shape into a helical shape, while guiding the press-wrapping tape along a feed direction, the tape forming section including
   a curved section that gradually curves the strip shaped press-wrapping tape while guiding the press-wrapping tape along the feed direction, and
   a helical section that is a helical tube shaped location further to a downstream side than a position where two edges of the curved section intersect with each other, the helical section causing two end portions of the press-wrapping tape that has been curved with the curved section to overlap and forming the press-wrapping tape into a helical shape, while guiding the press-wrapping tape along the feed direction, and gradually narrowing an external diameter of the helical shaped press-wrapping tape, wherein an outlet of the guide pipe is disposed further to the downstream side than the position where the two edges of the curved section intersect with each other.

2. The former according to claim 1, wherein the outlet of the guide pipe is disposed further to an upstream side than an end portion of the helical section to a downstream side.

3. The former according to claim 2, wherein an internal diameter of the end portion of the helical section to the downstream side is smaller than an external diameter of the guide pipe.

4. The former according to claim 1, wherein:
a leading end of the guide pipe to a downstream side is obliquely cut to form an elliptical shaped opening; and
a leading end portion is formed to a downstream side of an outlet positioned to an upstream end of the opening.

5. The former according to claim 4, wherein an outer face of the leading end portion is disposed facing an edge to an inside of the helical section.

6. The former according to claim 4, wherein the leading end portion is disposed to an inside of the helical section having an internal diameter smaller than an external diameter of the guide pipe.

7. The former according to claim 1, wherein:
a turn-back fold is formed to an edge of the curved section to restrain an end portion in a width direction of the press-wrapping tape; and
the turn-back fold is not formed in the helical section.

* * * * *